(12) United States Patent
Lei et al.

(10) Patent No.: US 12,522,730 B2
(45) Date of Patent: Jan. 13, 2026

(54) CONDUCTIVE LIQUID SILICONE RUBBER AND PREPARATION METHOD AND USE THEREOF

(71) Applicant: JIANGXI BLUESTAR XINGHUO SILICONE CO., LTD., Jiangxi (CN)

(72) Inventors: Lijuan Lei, Jiangxi (CN); Peng Guo, Jiangxi (CN); Xingzhi Shi, Jiangxi (CN); Zhehui Li, Jiangxi (CN)

(73) Assignee: JIANGXI BLUESTAR XINGHUO SILICONE CO., LTD., Jiangxi (CN)

( * ) Notice: Subject to any disclaimer, the term of this patent is extended or adjusted under 35 U.S.C. 154(b) by 1083 days.

(21) Appl. No.: 17/265,186

(22) PCT Filed: Aug. 1, 2019

(86) PCT No.: PCT/CN2019/098881
§ 371 (c)(1),
(2) Date: Feb. 1, 2021

(87) PCT Pub. No.: WO2020/025025
PCT Pub. Date: Feb. 6, 2020

(65) Prior Publication Data
US 2021/0253857 A1     Aug. 19, 2021

(30) Foreign Application Priority Data

Aug. 1, 2018 (CN) .......................... 201810866681.8
Aug. 22, 2018 (CN) .......................... 201810963080.9

(51) Int. Cl.
| | | |
|---|---|---|
| *C08L 83/04* | (2006.01) | |
| *C08G 77/08* | (2006.01) | |
| *C08G 77/12* | (2006.01) | |
| *C08G 77/20* | (2006.01) | |
| *C08G 77/62* | (2006.01) | |
| *C08J 3/00* | (2006.01) | |
| *C08J 3/22* | (2006.01) | |
| *C08K 3/04* | (2006.01) | |
| *C08K 3/36* | (2006.01) | |
| *C08K 5/05* | (2006.01) | |
| *C08K 5/5445* | (2006.01) | |
| *C08K 9/06* | (2006.01) | |

(52) U.S. Cl.
CPC .............. *C08L 83/04* (2013.01); *C08G 77/08* (2013.01); *C08G 77/12* (2013.01); *C08G 77/20* (2013.01); *C08G 77/62* (2013.01); *C08J 3/005* (2013.01); *C08J 3/226* (2013.01); *C08K 3/041* (2017.05); *C08K 3/36* (2013.01); *C08K 5/05* (2013.01); *C08K 5/5445* (2021.01); *C08K 9/06* (2013.01); *C08K 2201/001* (2013.01); *C08K 2201/003* (2013.01); *C08K 2201/004* (2013.01); *C08L 2203/202* (2013.01); *C08L 2205/025* (2013.01)

(58) Field of Classification Search
USPC ..................... 523/351; 524/495, 588
See application file for complete search history.

(56) References Cited

U.S. PATENT DOCUMENTS

| | | | | |
|---|---|---|---|---|
| 3,775,452 A | * | 11/1973 | Karstedt | ............. C07F 15/0086 502/169 |
| 2010/0308279 A1 | | 12/2010 | Zhou et al. | |
| 2015/0228372 A1 | | 8/2015 | Akitomo et al. | |
| 2015/0274929 A1 | * | 10/2015 | Brick | ...................... C08L 83/00 428/36.9 |
| 2020/0369886 A1 | * | 11/2020 | Kato | ...................... C08G 77/12 |

FOREIGN PATENT DOCUMENTS

| | | |
|---|---|---|
| CN | 1605604 A | 4/2005 |
| CN | 102010600 A | 4/2011 |
| CN | 102675882 A | 9/2012 |
| CN | 102924926 A | 2/2013 |
| CN | 103259239 A | 8/2013 |
| CN | 103665875 A | 3/2014 |
| CN | 103937258 A | 7/2014 |

(Continued)

OTHER PUBLICATIONS

Tuball (TM) Matrix 601/602 series concentrates Product Brochure, 5 pages, retrieved on-line, https://web.archive.org/web/20170603163038/http://ocsial.com/zh/products/tuball-matrix-601602/, copyright 2016. (Year: 2016).*
English language translation of CN 107964247A, 8 pages, published Apr. 27, 2018. (Year: 2018).*
English language translation of CN 102675882A, 6 pages, published Sep. 19, 2012. (Year: 2012).*
"Single-walled Carbon nanotubes—Tuball(TM), Conductive and colorable silicone material using Matrix," Naben Chemical Co., Ltd., Jeti, vol. 65, No. 6, 36-39, Nov. 22, 2017 (machine translation). (Year: 2017).*
Product Safety & Regulatory Affairs status of Tuball(TM) graphene nanotubes, 6 pages, Copyright OCSiAI 2018-2024. (Year: 2018).*

(Continued)

*Primary Examiner* — Fred M Teskin
(74) *Attorney, Agent, or Firm* — SHEPPARD, MULLIN, RICHTER & HAMPTON LLP

(57) ABSTRACT

A conductive liquid silicone rubber is described, in which the conductive filler used in the conductive liquid silicone rubber includes single-walled carbon nanotubes. Also described, is the use of single-walled carbon nanotubes as a conductive filler to prepare a single-walled carbon nanotube conductive liquid silicone rubber composite material. A two-step pre-mixing method and formulation design is also described that can effectively disperse the single-walled carbon nanotubes at an extremely small addition amount minimizing problems such as agglomeration, sedimentation and precipitation while reducing viscosity and enhancing processing performance. A resulting conductive liquid silicone rubber can exhibit not only a low conductive filler addition amount and excellent electrical properties, but also excellent physical and mechanical properties and weather resistance, as well reduced pollutant generation during vulcanization.

36 Claims, No Drawings

(56) References Cited

FOREIGN PATENT DOCUMENTS

| CN | 104327509 | A |   | 2/2015 |          |
|----|-----------|---|---|--------|----------|
| CN | 104513410 | A |   | 4/2015 |          |
| CN | 105255198 | A |   | 1/2016 |          |
| CN | 105331110 | A |   | 2/2016 |          |
| CN | 105566921 | A |   | 5/2016 |          |
| CN | 105838083 | A |   | 8/2016 |          |
| CN | 106589953 | A |   | 4/2017 |          |
| CN | 107189445 | A |   | 9/2017 |          |
| CN | 107964247 | A | * | 4/2018 | C08L 83/07 |
| CN | 108165019 | A |   | 6/2018 |          |
| EP | 3835362   | A1|   | 6/2021 |          |
| JP | 2005-62474| A |   | 3/2005 |          |
| JP | 2010043282| A |   | 2/2010 |          |
| JP | 2015-57763| A |   | 3/2015 |          |
| JP | 575742    | B2|   | 7/2015 |          |
| JP | 5757542   | B2|   | 7/2015 |          |
| KR | 100891437 | B1|   | 4/2009 |          |
| WO | 2007/035442 | A2 | | 3/2007 |          |
| WO | 2014/159792 | A1 | | 10/2014 |         |
| WO | 2020025025 | A1 | | 2/2020 |          |
| WO | 2020/061988 | A1 | | 4/2020 |         |

OTHER PUBLICATIONS

IOTA-273 Vinyl silicone oil Product Description, 3 pages, retrieved on-line, siliconeoil.net/product-hydroxy-silicone-oil.html, Copyright 2000-2024. (Year: 2000).*
International Search Report and Written Opinion issued Oct. 29, 2019 in corresponding International Patent Application No. PCT/CN2019/098881, filed Aug. 1, 2019, 12 pages.
Kim, Ta et al., "Single-walled carbon nanotube/silicone rubber compositions for compliant electrodes", Carbon, vol. 50, No. 2, Sep. 5, 2011 (Sep. 5, 2011), pp. 444-449, XP028331065, DOI: 10.1016/j.carbon.2011.08.070.
Ju, Xu et al. ,"Thermal properties of single walled carbon nanotube-silicone nanocomposites", Journal of Polymer Science Part B: Polymer Physics, John Wiley & Sons, Inc, US, vol. 46, No. 17, Sep. 1, 2008 (Sep. 1, 2008), US , pp. 1845-1852, XP055917045, ISSN: 0887-6266, DOI: 10.1002/polb.21519.

* cited by examiner

CONDUCTIVE LIQUID SILICONE RUBBER AND PREPARATION METHOD AND USE THEREOF

CROSS-REFERENCE TO PRIOR APPLICATIONS

This application is a National Stage of PCT/CN2019/098881, filed Aug. 1, 2019, and designating the United States (published on Feb. 6, 2020, as WO 2020/025025 A1), which claims priority under 35 U.S.C. § 119 to Chinese Patent Application No. 201810866681.8, filed Aug. 1, 2018 and Chinese Patent Application No. 201810963080.9, filed Aug. 22, 2018, each hereby expressly incorporated by reference in its entirety and each assigned to the assignee hereof.

TECHNICAL FIELD

The present invention relates to the technical field of silicone rubber, in particular to a conductive liquid silicone rubber.

BACKGROUND ART

With the improvement of technology and living standards, the industrial automatic and mechanized production, the frequent use of electronic instruments and equipment and the increased use of large household appliances, the stable transmission of electricity is a major challenge at this stage. To allow the electric cables to run for a long time, the electric stress control material is required to make the electric stress uniformly distributed at the shielding cut of middle joints and the end shielding cut of the electrical cable. Conductive silicone rubber is a special silicone rubber material. Its unique "organic-inorganic" co-existing main chain structure not only imparts the conductive silicone rubber a series of excellent characteristics such as high temperature resistance, low pressure change and high resilience, but also provides it a good electrical conductivity. In particular, conductive liquid silicone rubber has the characteristics of no formation of by-products during the cross-linking and curing process, extremely low shrinkage, capable of deep vulcanization, quickly vulcanization under heating achievable, and has excellent physical-mechanical properties and electrical properties. Due to the advantage of low energy consumption, low material consumption, high production efficiency in use, and capable of achieving automatic production, it is widely used in the power industry. However, the conductive fillers (such as conductive carbon black, conductive montmorillonite, metal powder, etc.) used in the conductive liquid silicone rubber for electric cable accessories on current market must be added in large amounts to meet the conductive requirements, and thus leads to the superior performances in terms of mechanical strength, toughness, elasticity and viscosity of the rubber itself and the like are greatly affected. Many studies have shown that conductive carbon black is commonly used as conductive filler in high addition amount, decarburization problem may occur during long-term use, resulting in instability of resistivity, thereby bringing a risk to the electrical stress control of electric cable accessories.

In Chinese patent application CN1605604A, silver-plated glass powder, silver-plated nickel powder, silver-plated copper powder, silver-plated aluminum powder and silver powder are used as conductive fillers to prepare highly conductive rubber, but the amount of conductive filler added is as high as 200 to 600 parts by mass, resulting in poor mechanical properties of material. The conductive fillers used in Chinese patent applications CN104327509A and CN103665875A are acetylene carbon black or other fillers, all of which have the disadvantages of large addition of acetylene carbon black, poor mechanical properties of conductive silicone rubber, and complicated processes. In Chinese patent application CN106589953A, an ideal powder accumulation effect is achieved by using a composite system of conductive powders of different particle sizes and shapes and a combination of conductive powders with large and small particle sizes, and then a highly conductive liquid silicon rubber with a low filling amount is obtained. However, the conductive powders used are gold powder, graphite powder, etc., and they are all of micron grade, which is not beneficial to environmental protection and health.

Carbon nanotubes have been used in conductive rubber due to their high conductivity and excellent mechanical properties. Chinese patent application CN103937258A discloses a method for preparing a conductive silicone rubber with high resilience, said method involves using the modified the multi-walled carbon nanotubes or conductive carbon black as conductive fillers to prepare conductive silicone rubber with high resilience, but the modified conductive fillers are added to the raw silicone rubber before vulcanization, rather than added to the raw material for preparing rubber, and the addition amount is 5 to 40 parts, so that a majority of the tensile strength is 4 to 6 MPa, a majority of elongation at break is less than 200%, which greatly limits its application.

Single-walled carbon nanotubes are a kind of one-dimensional quantum material with a special structure, which are several to dozens of layers of coaxial circular tubes mainly composed of carbon atoms arranged in a hexagonal shape with a fixed distance of about 0.34 nm between the layers, a diameter of 1 nm to 50 nm, and a length of greater than 5 µm. Single-walled carbon nanotubes have good electrical conductivity, extremely high elasticity and strength, thermal stability and weather resistance, the electrical conductivity requirements for material can be met even filling in a tiny amount, in addition, the tiny amount of filling can maintain the strength, toughness and viscosity of the silicone rubber itself, and keep stability in complex environments. Therefore, single-walled carbon nanotubes are a kind of ideal conductive filler for liquid rubbers. In the known range, the use of single-wall carbon nanotubes to prepare conductive liquid silicone rubber materials, especially for electric cable accessory applications, is still a blank in domestic and abroad. At the same time, it is also an urgent problem to be solved that how to ensure thorough and uniform dispersion of single-walled carbon nanotubes at low filling amount in rubber system.

CONTENTS OF THE INVENTION

One objective of the present invention is to overcome the defects in the prior art and provide a conductive liquid silicone rubber material with low filling amount of single-walled carbon nanotubes polyorganosiloxane. The conductive liquid silicone rubber material provided by the present invention not only has good electrical conductivity, but also has high mechanical strength, good processability, and strong weather resistance, and can be rapidly cured and formed at high temperature without producing by-products.

Specifically, the present invention provides a conductive liquid silicone rubber, the conductive filler used in the conductive liquid silicone rubber includes single-walled carbon nanotubes.

Preferably, the conductive liquid silicone rubber provided by the present invention uses single-walled carbon nanotubes as conductive filler.

In order to ensure that the liquid silicone rubber has good electrical conductivity, it is preferred in the present invention that single-walled carbon nanotubes at a low filling amount of 0.1% to 10% percentage by mass (relative to the total mass of the liquid silicone rubber) as conductive filler are added into the liquid silicone rubber.

The single-walled carbon nanotubes of the present invention are a kind of one-dimensional quantum material with a special structure, which are several to dozens of layers of coaxial circular tubes mainly composed of carbon atoms arranged in a hexagonal shape, with a fixed distance of about 0.34 nm between the layers, a diameter of 1 nm to 50 nm (preferably 1.2 nm to 50 nm or 2 nm to 50 nm), and a length of greater than 5 μm. In the present invention, it has been found through a lot of practices that when the single-walled carbon nanotubes have a specific diameter and length, for example, a diameter of 1 nm to 50 nm and a length of greater than 5 μm, preferably a diameter of 1.2 nm to 2 nm and a length of greater than 10 μm, more preferably a diameter of 1.2 nm to 2 nm and a length of 12 μm, and have sufficient aspect ratio and specific surface area to allow it be dispersed into liquid silicone rubber, it is able to ensure the final product to have good electrical conductivity, and then used in electric cable accessories and other fields.

In order to thoroughly and uniformly disperse the single-walled carbon nanotubes in the liquid silicone rubber, the present invention preferably adopts a two-step pre-mixing method.

First, single-walled carbon nanotubes and a polyorganosiloxane are premixed to obtain a premix. As a preferred embodiment of the present invention, the single-walled carbon nanotubes constitute 5% to 20% percentage by mass of the premix.

Secondly, the premix of single-walled carbon nanotubes and polyorganosiloxane is mixed with a base rubber to prepare a masterbatch. Preferably, the mass ratio of the premix of single-walled carbon nanotubes and the base rubber contained in the masterbatch of the present invention is (1 to 10):100, more preferably (3.8 to 10):100. Then, the masterbatch is mixed with other components and vulcanized to prepare rubber.

Wherein, the polyorganosiloxane mixed with carbon nanotubes to obtain the premix can be of any kind that can be determined by those skilled in the art according to actual needs.

The base rubber of the present invention is a basic component for preparing the conductive liquid silicone rubber, and can be prepared by using existing raw materials and processes in the art. In order to ensure that the base rubber is a good dispersion medium for single-walled carbon nanotubes and further to ensure that the final product obtained has excellent electrical conductivity property, it is preferred in the present invention that the base rubber comprises thoroughly and uniformly mixed vinyl silicone oil, silica, silazane and deionized water; more preferably, the base rubber comprises 30 to 70 parts of vinyl silicone oil, 15 to 40 parts of silica, 5 to 15 parts of silazane, and 1 to 10 parts of deionized water; further preferably, the base rubber comprises 50 to 65 parts of vinyl silicone oil, 25 to 30 parts of silica, 7 to 9 parts of silazane and 3 to 6 parts of deionized water.

In order to allow the components to be mixed thoroughly between them, it is preferred in the present invention that the base rubber is prepared by a process comprising the following steps: providing methyl vinyl silicone oil, silica, silazane and deionized water, thoroughly mixing at 60° C. to 90° C. under the protection of an inert atmosphere, then heated to 130° C. to 180° C. and starting vacuuming for 2 to 4 hours, kept at temperature of 130° C. to 180° C. during the vacuuming, cooled to a temperature of 120° C. to 140° C. after the completion of vacuuming, and then adding methyl vinyl silicone oil for dilution, stirred until homogeneous to obtain the product.

The vinyl silicone oil used to prepare the base rubber is preferably one or a mixture of two selected from vinyl-terminated silicone oil and polyvinyl silicone oil. In order to ensure the better dispersion of single-walled carbon nanotubes in liquid silicone rubber, the viscosity of the vinyl-terminated silicone oil used in the present invention does not exceed 150,000 mPa·s, preferably 60,000 to 100,000 mPa·s. The vinyl-terminated silicone oil of the present invention is preferably an alkyl vinyl silicone oil, more preferably a methyl vinyl silicone oil. Through a lot of practices, it has been discovered by the present invention that the mechanical properties of the conductive liquid silicone rubber can be improved by optimizing the vinyl silicone oil in terms of specific component selection, combination mode and viscosity.

The silica used for the preparation of the base rubber is preferably a fumed silica grafted in situ with a treating agent such as silazane, which has a specific surface area of not less than 200 $m^2/g$, preferably 280 to 320 $m^2/g$.

The silazane used for the preparation of the base rubber is preferably at least one or a mixture of two selected from hexamethylsilazane, tetramethyldivinylsilazane, heptamethyldisilazane, vinyl-mono-terminated silazane, etc., and is more preferably hexamethylsilazane and/or tetramethyldivinylsilazane.

When obtaining the masterbatch, it is preferred in an embodiment provided by the present invention that the premix of single-walled carbon nanotubes and polyorganosiloxane is mixed with the base rubber prepared from the above-mentioned parts by weight of raw materials in a mass ratio of 1-10:100 on a three-roll mill, preferably the mixing is carried out until the resulting mixture has a particle size of 0.1 μm to 20 μm to obtain a conductive liquid silicone rubber masterbatch. It has been found by the present invention through a lot of practices that the mixing of the premix of single-walled carbon nanotubes with the base rubber in the above-mentioned ratio on three-roll mill can ensure the thorough and uniform dispersion of single-walled carbon nanotubes in the masterbatch, and then ensure its thorough and uniform dispersion in the final product and thus allow the liquid silicone rubber to have excellent electrical conductivity effect and excellent mechanical properties.

In order to further improve the comprehensive performance of the conductive liquid silicone rubber including conductivity, it is preferred in the present invention that in addition to the masterbatch, the raw materials for preparing the liquid silicone rubber further comprise: a Component I, a Component II, a catalyst and an inhibitor.

As a preferred embodiment of the present invention, the raw materials for preparing the liquid silicone rubber include: the masterbatch in an amount of 100 parts, the Component I in an amount of 10 to 100 parts, preferably 10 to 65 parts, more preferably 10 to 35 parts, the Component II in an amount of 0.4 to 10 parts, preferably 0.4 to 5 parts, the catalyst in an amount of 0.002 to 0.02 parts, preferably 0.003 to 0.01 parts, and the inhibitor in an amount of 0.02 to 1 parts, preferably 0.02 to 0.5 parts.

The Component I is one or a mixture of several of the compounds represented by the general Formula (1):

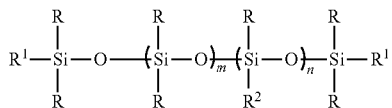

In the general Formula (1), n represents an integer from 0 to 100, preferably an integer from 20 to 50; m represents an integer from 70 to 4000, preferably an integer from 150 to 2000; R represents a saturated hydrocarbyl, such as methyl, ethyl, propyl, butyl, etc.; $R^1$ represents an unsaturated hydrocarbyl, such as vinyl, allyl, butyl-1-ene, etc.; $R^2$ represents a saturated or unsaturated hydrocarbyl, which can be any one of methyl, ethyl, vinyl, propyl, allyl, butyl, butyl-1-ene, etc. In the present invention, the Component I is preferably selected from the following components: a vinyl-terminated silicone oil in which $R^1$ is vinyl and $R^2$ is a saturated hydrocarbyl, and/or a side chain vinyl silicone oil in which $R^1$ is a saturated hydrocarbyl and $R^2$ is vinyl, and/or a vinyl-terminated side chain vinyl silicone oil in which both $R^1$ and $R^2$ are vinyl.

In order to improve the comprehensive performance of the final product, in the present invention, the mass content of the vinyl in the Component I is preferably 0.05% to 5% of the total amount of the Component I.

The Component II is one or a mixture of several of compounds represented by general Formulas (2) and (3):

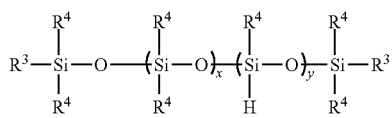

In the general Formula (2), x represents an integer from 8 to 200, preferably an integer from 10 to 100; y represents an integer from 0 to 60, preferably an integer from 0 to 20; $R^3$ may be methyl, hydrogen or SiH group; $R^4$ may be methyl, ethyl, propyl or phenyl.

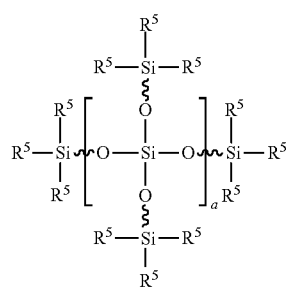

In the general formula (3), a represents an integer of 1 to 300; $R^5$ may be methyl, ethyl or hydrogen group.

When the Component II consists of only the compound of the general Formula (2), the two conditions that y=0 and $R^3$ is methyl do not exist at the same time. When the Component II consists of only the compound of the general Formula (3), $R^5$ is a hydrogen group. When the Component II is one or a mixture of several of the compounds of the general Formulas (2) and (3), at least one of the compounds of the general Formulas (2) and (3) has a SiH bond.

In the present invention, the Component II is preferably selected from the following components: a hydrogen-containing silicone oil in which $R^3$ is hydrogen group and y is greater than 1 and both ends and side chain contain SiH, and/or a terminal hydrogen-containing silicone oil in which $R^3$ is hydrogen group and y is 0, and/or a side chain hydrogen-containing silicone oil in which $R^3$ is a saturated hydrocarbyl and y is greater than 1, and/or a hydrogen-containing silicone resin in which $R^5$ is hydrogen group.

In order to improve the comprehensive performance of the final product, in the present invention, it is preferred that the mass content of the Si—H group in the Component II is 3% to 50% of the total amount of the Component II, and more preferably at least one of component of the Component II contains three Si—H functional group in order to form a three-dimensional network structure with a certain crosslinking density.

The catalyst is preferably a Karstedt catalyst.

The inhibitor may be at least one selected from the group consisting of 1-ethynyl-1-cyclohexanol, 2-methyl-3-butyn-ol, 3,5-dimethyl-1-hexyn-3-ol and 3-methyl-1-dodecyn-3-ol.

The present invention also provides a preparation method of the liquid silicone rubber.

Preferably, the preparation method comprises the following steps: firstly, single-walled carbon nanotubes and a polyorganosiloxane are pre-mixed to obtain a premix; preferably, the single-walled carbon nanotubes constitute 5% to 20% percentage by mass of the premix; secondly, the premix and a base rubber are mixed to prepare a masterbatch, and then the masterbatch is mixed with other raw materials and vulcanized to prepare a conductive liquid silicone rubber; preferably, the mass ratio of the premix and the base rubber contained in the masterbatch is (1 to 10):100, more preferably (3.8 to 10):100, preferably, the other raw materials include: a Component I, a Component II, a catalyst and an inhibitor.

Specifically, the preparation method comprises the following steps: uniformly mixing the masterbatch containing single-walled carbon nanotubes, a catalyst and at least one Component I, and vacuum degassing to obtain a Component A; uniformly mixing a masterbatch containing single-walled carbon nanotubes, at least one Component I, at least one Component II and at least one inhibitor, and vacuum degassing to obtain Component B; uniformly mixing the Component A and the Component B in equal proportion, subjected to curing to obtain a test piece, and vulcanized to obtain the product. Wherein, the curing is preferably carried out at a temperature of 130° C. to 170° C.; and the vulcanization is preferably carried out at a temperature of 180° C. to 220° C.

As a preferred embodiment of the present invention, the preparation method comprises the following specific steps:
(1) Preparation of premix: premixing the single-walled carbon nanotubes and the polyorganosiloxane to obtain the premix, wherein the single-walled carbon nanotubes constitute 5% to 20% percentage by mass of the premix;

(2) Preparation of base rubber: taking a methyl vinyl silicone oil, a silica, a silazane and a deionized water, thoroughly mixing under the protection of inert atmosphere at 60° C. to 90° C., then heated to 130° C. to 180° C. and starting vacuuming, kept at temperature of 130° C. to 180° C. during the vacuuming, cooled to a temperature of 120° C. to 140° C. after the completion of vacuuming, adding a methyl vinyl silicone oil for dilution, stirred until homogeneous to obtain the base rubber;

(3) Preparation of masterbatch: thoroughly mixing the premix containing single-walled carbon nanotubes and the base rubber on a three-roll mill to obtain the masterbatch;

(4) Preparation and vulcanization of Components A and B: uniformly mixing the masterbatch, the catalyst and at least one Component I, vacuum degassing to obtain a Component A; uniformly mixing the masterbatch, at least one Component I, at least one Component II and at least one inhibitor, vacuum degassing to obtain a Component B; uniformly mixing the Component A and the Component B in equal proportion, subjected to curing to obtain a test piece, and vulcanized to obtain the product.

The process conditions such as temperature and time in the present invention are all preferred ranges, but the protection scope of the present invention is not limited thereto.

The liquid silicone rubber provided by the present invention has excellent comprehensive properties, including electrical conductivity, tensile strength, elongation at break and other physical and mechanical properties. The present invention also seeks to protect a use of the liquid silicone rubber in manufacture of power grid accessories and/or electric cable accessories.

Compared with the prior art, the present invention has prepared a single-walled carbon nanotube conductive liquid silicone rubber composite material for the first time by using single-walled carbon nanotubes as conductive fillers. At the same time, by adopting two-step pre-mixing and formulation design, effectively dispersing the single-walled carbon nanotubes at an extremely small addition amount in the whole system is achieved, and the problems such as agglomeration, sedimentation and precipitation are avoided while the viscosity of the product is reduced and the processing performance is enhanced, thereby forming an effective conductive network path and preparing a conductive material with a volume resistivity of less than 100 Ωcm. The conductive liquid silicone rubber provided by the present invention not only has low conductive filler addition amount, excellent electrical properties, but also has excellent physical and mechanical properties and weather resistance, as well as advantages of no pollutant generated in the vulcanization process, simple production process with no pollution, and convenient operation.

SPECIFIC MODELS FOR CARRYING OUT THE INVENTION

The technical solution of the present invention will be further fully described in detail in conjunction with the examples below.

The single-walled carbon nanotubes used in the following examples were commercially available and had a diameter of about 1.5 nm (in the range of 1.2 nm to 2 nm) and a length of 12 μm.

Preparation of Liquid Conductive Silicone Rubber

Example 1

In this example, a single-walled carbon nanotube conductive liquid silicone rubber was provided, which was prepared by the following method:

(1) Preparation of premix: the single-walled carbon nanotubes and polyorganosiloxane were pre-mixed to obtain a premix, wherein the single-walled carbon nanotubes constitute 10% percentage by mass of the premix.

(2) Preparation of base rubber: in a kneader or planetary mixer, 42 parts by weight of methyl vinyl silicone oil with a viscosity of 60000 mPa·s, 26 parts of fumed silica with a BET specific surface area of 300 $m^2/g$ and 7 parts of hexamethyldisilazane, 0.05 parts of tetramethyldivinylsilazane and 3.5 parts of deionized water were thoroughly mixed for 1.5 hours under the protection of an inert atmosphere at a temperature below 80° C., then heated to 140° C. and subjected to vacuuming for 3 hours, kept at a temperature of 160° C. during vacuuming, then cooled to 125° C., added with 21.5 parts of methyl vinyl silicone oil with a viscosity of 60,000 mPa·s, and stirred until homogeneous to obtain base rubber No. 1 of liquid silicone rubber.

(3) Preparation of masterbatch: 3.8 parts of the premix obtained in step (1) and 100 parts of the base rubber 1 were mixed 10 times on a three-roll mill (the mixture has particle size of 0.1 to 20 microns) to prepare masterbatch No. 1 of conductive liquid silicone rubber;

(4) Preparation and vulcanization of Components A and B: 100 parts of the above-mentioned masterbatch 1, 18 parts of vinyl-terminated silicone oil with a viscosity of 20000 mPa·s, 5 parts of side-chain vinyl silicone oil with a viscosity of 1000 mPa·s, 0.02 parts of Karstedt catalyst were stirred and dispersed in a planetary mixer for 35 minutes, mixed until homogeneous and then degassed by vacuuming to obtain Component A No. 1 of conductive liquid silicone rubber. 100 parts of the above-mentioned masterbatch 1, 20 parts of vinyl-terminated silicone oil with a viscosity of 20000 mPa·s, 3 parts of side-chain vinyl silicone oil with a viscosity of 1000 mPa·s, 1.5 parts of hydrogen-containing silicone oil containing SiH at both ends and side chains with a hydrogen content of 0.7%, 1.5 parts of terminal hydrogen-containing silicone oil with a hydrogen content of 0.2%, and 0.1 parts of 3-methyl-1-dodecyn-3-ol were stirred and dispersed in a planetary mixer for 35 minutes, mixed until homogeneous and then degassed by vacuuming to obtain Component B No. 1 of conductive liquid silicone rubber. The Component A No. 1 at equal proportion and the Component B No. 1 at equal proportion were uniformly mixed, then cured at 150° C. for 10 minutes to obtain a 2 mm test piece, and the test piece was secondly vulcanized at 200° C. for 4 hours to obtain single-walled carbon nanotube conductive liquid silicone rubber.

Example 2

In this example, a single-walled carbon nanotube conductive liquid silicone rubber was provided, which was prepared by the following method:

(1) Preparation of premix: the same as Example 1;

(2) Preparation of base rubber: in a kneader or planetary mixer, 40 parts by weight of methyl vinyl silicone oil with a viscosity of 60000 mPa·s, 25 parts of fumed silica with a BET specific surface area of 300 m²/g, 7 parts of hexamethyldisilazane, 0.1 parts of tetramethyldivinylsilazane and 4 parts of deionized water were thoroughly mixed for 1.5 hours under the protection of an inert atmosphere at a temperature of below 80° C., then heated to 140° C. and subjected to vacuuming for 3 hours, kept at a temperature of 160° C. during vacuuming, then cooled to 125° C., added with 23.9 parts of methyl vinyl silicone oil with a viscosity of 60,000 mPa·s, and stirred until homogeneous to obtain base rubber No. 2 of liquid silicone rubber.

(3) Preparation of masterbatch: 5 parts of the premix obtained in step (1) and 100 parts of the base rubber 2 were mixed 5 times on a three-roll mill (the mixture has particle size of 0.1 to 20 microns) to prepare masterbatch No. 2 of conductive liquid silicone rubber;

(4) Preparation and vulcanization of Components A and B: 100 parts of the above-mentioned masterbatch 2, 10 parts of vinyl-terminated silicone oil with a viscosity of 3500 mPa·s, 3 parts of side-chain vinyl silicone oil with a viscosity of 1000 mPa·s, 0.02 parts of Karstedt catalyst were stirred and dispersed in a planetary mixer for 30 to 40 minutes, mixed until homogeneous and then degassed by vacuuming to obtain Component A No. 2 of conductive liquid silicone rubber. 100 parts of the above-mentioned masterbatch 2, 7 parts of vinyl-terminated silicone oil with a viscosity of 3500 mPa·s, 1 part of side-chain vinyl silicone oil with a viscosity of 1000 mPa·s, 3 parts of hydrogen-containing silicone oil containing SiH at both ends and side chains with a hydrogen content of 0.7%, 0.1 parts of 3-methyl-1-dodecyn-3-ol were stirred and dispersed in a planetary mixer for 30 to 40 minutes, mixed until homogeneous and then degassed by vacuuming to obtain Component B No. 2 of conductive liquid silicone rubber. The Component A No. 2 at equal proportion and the Component B No. 2 at equal proportion were uniformly mixed, then cured at 150° C. for 10 minutes to obtain a 2 mm test piece, and the test piece was secondly vulcanized at 200° C. for 4 hours to obtain single-walled carbon nanotube conductive liquid silicone rubber.

Example 3

In this example, a single-walled carbon nanotube conductive liquid silicone rubber was provided, which was prepared by the following method:

(1) Preparation of premix: the same as Example 1;

(2) Preparation of base rubber: in a kneader or planetary mixer, 38 parts by weight of methyl vinyl silicone oil with a viscosity of 100,000 mPa·s, 7 parts of methyl vinyl silicone oil with a viscosity of 60,000 mPa·s, 25 parts of fumed silica with a BET specific surface area of 300 m²/g, 7 parts of hexamethyldisilazane, 0.15 parts of tetramethyldivinylsilazane and 6 parts of deionized water were thoroughly mixed for 1.5 hours under the protection of an inert atmosphere at a temperature of below 80° C., then heated to 140° C. and subjected to vacuuming for 3 hours, kept at a temperature of 160° C. during vacuuming, then cooled to 125° C., added with 16.8 parts of methyl vinyl silicone oil with a viscosity of 20,000 mPa·s, and stirred until homogeneous to obtain base rubber No. 3 of liquid silicone rubber.

(3) Preparation of masterbatch: 4 parts of the premix obtained in step (1) and 100 parts of the base rubber 3 were mixed 10 times on a three-roll mill (the mixture has particle size of 0.1 to 20 microns) to prepare masterbatch No. 3 of conductive liquid silicone rubber;

(4) Preparation and vulcanization of Components A and B: 100 parts of the above-mentioned masterbatch 3, 11 parts of vinyl-terminated silicone oil with a viscosity of 100,000 mPa·s, 3.5 parts of side-chain vinyl silicone oil with a viscosity of 1000 mPa·s, 0.015 parts of Karstedt catalyst were stirred and dispersed in a planetary mixer for 30 to 40 minutes, mixed until homogeneous and then degassed by vacuuming to obtain Component A No. 1 of conductive liquid silicone rubber. 100 parts of the above-mentioned masterbatch 3, 12 parts of vinyl-terminated silicone oil with a viscosity of 100,000 mPa·s, 1.7 parts of hydrogen-containing silicone oil containing SiH at both ends and side chains with a hydrogen content of 0.7%, 0.5 parts of hydrogen-containing silicone oil containing SiH at both ends, 0.08 parts of 1-ethynyl-1-cyclohexanol were stirred and dispersed in a planetary mixer for 30 to 40 minutes, mixed until homogeneous and then degassed by vacuuming to obtain Component B No. 3 of conductive liquid silicone rubber. The Component A No. 3 at equal proportion and the Component B No. 3 at equal proportion were uniformly mixed, then cured at 150° C. for 10 minutes to obtain a 2 mm test piece, and the test piece was secondly vulcanized at 200° C. for 4 hours to obtain single-walled carbon nanotube conductive liquid silicone rubber.

Example 4

In this example, a single-walled carbon nanotube conductive liquid silicone rubber was provided, which was prepared by the following method:

(1) Preparation of premix: the same as Example 1;

(2) Preparation of base rubber: the same as Example 3;

(3) Preparation of masterbatch: 3.5 parts of the premix obtained in step (1) and 100 parts of the base rubber 3 were mixed 10 to 20 times in a three-roll mill (the mixture has particle size of 0.1 to 20 microns) to prepare masterbatch No. 4 of conductive liquid silicone rubber;

(4) Preparation and vulcanization of Components A and B: 100 parts of the above-mentioned masterbatch 4, 20 parts of vinyl-terminated silicone oil with a viscosity of 20,000 mPa·s, 2 parts of side-chain vinyl silicone oil with a viscosity of 1000 mPa·s, 0.025 parts of Karstedt catalyst were stirred and dispersed in a planetary mixer for 30 to 40 minutes, mixed until homogeneous and then degassed by vacuuming to obtain Component A No. 4 of conductive liquid silicone rubber. 100 parts of the above-mentioned masterbatch 4, 15 parts of vinyl-terminated silicone oil with a viscosity of 20,000 mPa·s, 1 part of side-chain vinyl silicone oil with a viscosity of 1000 mPa·s, 1 part of hydrogen-containing silicone oil containing SiH at both ends and side chains with a hydrogen content of 0.7%, 0.13 parts of 3-methyl-1-dodecyn-3-ol were stirred and dispersed in a planetary mixer for 30 to 40 minutes, mixed until homogeneous and then degassed by vacuuming to obtain Component B No. 4 of conductive liquid silicone rubber. The Component A No. 4 at equal proportion and the Component B No. 4 at equal proportion were uniformly mixed, then cured at 150° C. for 10 minutes to obtain a 2 mm test piece, and the test piece was secondly vulcanized at 200° C. for 4 hours to obtain single-walled carbon nanotube conductive liquid silicone rubber.

Example 5

In this example, a single-walled carbon nanotube conductive liquid silicone rubber was provided, which was prepared by the following method:

(1) Preparation of premix: the same as Example 1;
(2) Preparation of base rubber: in a kneader or planetary mixer, 40 parts by weight of methyl vinyl silicone oil with a viscosity of 60,000 mPa·s, 2.5 parts of polyvinyl silicone oil with a viscosity of 20,0000 mPa·s, 27.5 parts of fumed silica with a BET specific surface area of 300 m$^2$/g, 8 parts of hexamethyldisilazane, 0.7 parts of tetramethyldivinylsilazane and 4.5 parts of deionized water were thoroughly mixed for 1.5 hours under the protection of an inert atmosphere at a temperature of below 80° C., then heated to 140° C. and subjected to vacuuming for 3 hours, kept at a temperature of 160° C. during vacuuming, then cooled to 125° C., added with 16.8 parts of methyl vinyl silicone oil with a viscosity of 60,000 mPa·s, and stirred until homogeneous to obtain base rubber No. 5 of liquid silicone rubber.
(3) Preparation of masterbatch: 6 parts of the premix obtained in step (1) and 100 parts of the base rubber 5 were mixed 20 times on a three-roll mill (the mixture has particle size of 0.1 to 20 microns) to prepare masterbatch No. 5 of conductive liquid silicone rubber;
(4) Preparation and vulcanization of Components A and B: 100 parts of the above-mentioned masterbatch 5, 15 parts of vinyl-terminated silicone oil with a viscosity of 20,000 mPa·s, 6 parts of vinyl-terminated side-chain vinyl silicone oil with a vinyl mass content of 2.36%, 0.018 parts of Karstedt catalyst were stirred and dispersed in a planetary mixer for 30 to 40 minutes, mixed until homogeneous and then degassed by vacuuming to obtain Component A No. 5 of conductive liquid silicone rubber. 100 parts of the above-mentioned masterbatch 5, 14.5 parts of vinyl-terminated silicone oil with a viscosity of 100,000 mPa·s, 6.5 parts of hydrogen-containing silicone oil containing SiH at both ends and side chains with a hydrogen content of 0.7%, 0.13 parts of 3-methyl-1-dodecyn-3-ol were stirred and dispersed in a planetary mixer for 30 to 40 minutes, mixed until homogeneous and then degassed by vacuuming to obtain Component B No. 5 of conductive liquid silicone rubber. The Component A No. 5 at equal proportion and the Component B No. 5 at equal proportion were uniformly mixed, then cured at 150° C. for 10 minutes to obtain a 2 mm test piece, and the test piece was secondly vulcanized at 200° C. for 4 hours to obtain single-walled carbon nanotube conductive liquid silicone rubber.

Example 6

In this example, a single-walled carbon nanotube conductive liquid silicone rubber was provided. Compared with Example 4, the only difference was that: when preparing the masterbatch, mixing on a three-roll mill was replaced by the way of mixing with a planetary mixer;
The specific steps were:
(1) Preparation of premix: the same as Example 1;
(2) Preparation of base rubber: the same as Example 3;
(3) Preparation of masterbatch: 3.5 parts of the premix obtained in step (1) and 100 parts of the base rubber 3 were placed into a planetary mixer and dispersed at a rotation speed of 1200 r/min for 30 min to prepare masterbatch No. 7 of conductive liquid silicone rubber;
(4) Preparation and vulcanization of Components A and B: 100 parts of the above-mentioned masterbatch 7, 20 parts of vinyl-terminated silicone oil with a viscosity of 20,000 mPa·s, 2 parts of side-chain vinyl silicone oil with a viscosity of 1000 mPa·s, 0.025 parts of Karstedt catalyst were stirred and dispersed in a planetary mixer for 30 to 40 minutes, mixed until homogeneous and then degassed by vacuuming to obtain Component A No. 7 of conductive liquid silicone rubber. 100 parts of the above-mentioned masterbatch 7, 15 parts of vinyl-terminated silicone oil with a viscosity of 20,000 mPa·s, 1 part of side-chain vinyl silicone oil with a viscosity of 1000 mPa·s, 1 part of hydrogen-containing silicone oil containing SiH at both ends and side chains with a hydrogen content of 0.7%, 0.13 parts of 3-methyl-1-dodecyn-3-ol were stirred and dispersed in a planetary mixer for 30 to 40 minutes, mixed until homogeneous and then degassed by vacuuming to obtain Component B No. 7 of conductive liquid silicone rubber. The Component A No. 7 at equal proportion and the Component B No. 7 at equal proportion were uniformly mixed, then cured at 150° C. for 10 minutes to obtain a 2 mm test piece, and the test piece was secondly vulcanized at 200° C. for 4 hours to obtain single-walled carbon nanotube conductive liquid silicone rubber.

Comparative Example 1

During the preparation process, the mixture of single-walled carbon nanotubes and polyorganosiloxane was not added, and the remaining raw materials and operation steps were completely the same as in Example 1.

Comparative Example 2

A single-walled carbon nanotube conductive liquid silicone rubber was provided. Compared with Example 1, the only difference was that: single-walled carbon nanotubes were used to replace the premix of single-walled carbon nanotubes and polyorganosiloxane, i.e. single-walled carbon nanotubes were directly mixed with base rubber to prepare the masterbatch.

Comparative Example 3

A single-walled carbon nanotube conductive liquid silicone rubber was provided. Compared with Example 1, the only difference was that: a premix of polyorganosiloxane and single-walled carbon nanotubes was not prepared, and a masterbatch was not prepared by mixing a premix and a base rubber, instead, directly mixing untreated single-walled carbon nanotubes with Components A and B.

Comparative Example 4

A single-walled carbon nanotube conductive liquid silicone rubber was provided. Compared with Example 1, the only difference was that after a premix of single-walled carbon nanotubes was prepared, the premix was not mixed with a base rubber to prepare a masterbatch, instead, the premix was directly mixed with Components A and B.

Detection of Liquid Conductive Silicone Rubber

The conductive liquid silicone rubbers provided by Examples 1 to 7 were detected for their performance.
The detection method for volume resistance and calculation of volume resistivity adopted GB/T2439-2001; the detection method for tensile strength and elongation at break adopted ASTM D412-1998a(2002)e1; the detection method for hardness adopted ASTM D2240; the detection method for tearing strength adopted ASTM D624; the detection method for resilience rate adopted ASTM D7121-2005 (2012).

The detection results were shown in Table 1.

TABLE 1

Performances of product test pieces of conductive liquid silicone rubbers

| Performance | Hardness (Shore A) | Tensile strength (MPa) | Elongation at break (%) | Resilience rate (%) | Tearing strength (kN/m) | Volume resistivity Ω · cm | Viscosity (Pa · s) (@10-1) |
|---|---|---|---|---|---|---|---|
| Example 1 | 42 | 8.6 | 688 | 46 | 31 | 58 | 235 |
| Example 2 | 45 | 8.4 | 710 | 48 | 25 | 40 | 220 |
| Example 3 | 43 | 9.0 | 842 | 44 | 24 | 60 | 310 |
| Example 4 | 28 | 7.8 | 933 | 36 | 25 | 150 | 310 |
| Example 5 | 65 | 8.8 | 520 | 52 | 45 | 28 | 290 |
| Example 6 | 30 | 6.7 | 940 | 31 | 27 | 59 | 295 |
| Comparative Example 1 | 31 | 9.1 | 670 | 50 | 27 | >1.00E+15 | 168 |
| Comparative Example 2 | 47 | 5.6 | 513 | 49 | 30 | —*a | 271 |
| Comparative Example 3 | 43 | 5.58 | 468 | 49 | 29.35 | —*b | 236 |
| Comparative Example 4 | 37 | 4.6 | 470 | 50 | 26.6 | 36806 | 223 |

*a A non-uniform product piece has resulted in a large deviation of the measurement;
*b A non-uniform product piece has resulted in a large deviation of the measurement.

As can be seen from the results in Table 1, by using the two-step pre-mixing method involving preparing a premix and mixing the premix with a base rubber to obtain a masterbatch, effectively dispersing the single-walled carbon nanotubes in an extremely small amount of addition in the whole system was achieved, and the resulting liquid silicone rubber not only had good electrical conductivity, but also had excellent mechanical properties, including electrical conductivity, tensile strength, elongation at break, etc. On the contrary, the pre-mixing method without the above two steps could not give meaningful measurement results for volume resistivity (as shown in Comparative Example 3), and when the step of mixing single-walled carbon nanotubes with polyorganosiloxane to prepare a premix was not employed, meaningful measurement results of volume resistivity could not be obtained as well (as shown in Comparative Example 2). Even if a premix of single-walled carbon nanotubes and polyorganosiloxane was used, if the step of mixing the premix with a base rubber to prepare a masterbatch was not adopted, the resulted volume resistivity could not meet the application requirements of power grid accessories or electric cable accessories (as shown in Comparative Example 4).

The conductive liquid silicone rubber provided by the present invention had good electrical conductivity and excellent mechanical strength, and at the same time had the characteristics of low viscosity, good fluidity and easiness of injection molding. By increasing the addition proportion of the premix of single-walled carbon nanotubes within a certain range, the electrical conductivity of the product could be enhanced with less effect on mechanical properties, and the product could fully meet the application requirements for power industry. On the contrary, when the same proportion of single-walled carbon nanotube powder filler was directly added, the carbon nanotubes could not be uniformly dispersed, and the resultant product has shown inhomogeneous appearance and poor tensile properties. By using the way of adding premix, on the one hand, the process was environmentally friendly and clean, on the other hand, the nanotubes were uniformly dispersed, and the product showed excellent mechanical properties and good electrical properties.

Although the general description, specific embodiments and tests have been used to describe the present invention in detail above, some modifications or improvements can be made on the basis of the present invention, which is obvious to those skilled in the art. Therefore, these modifications or improvements made without departing from the spirit of the present invention all fall into the scope of the present invention.

The invention claimed is:

1. A masterbatch of a conductive liquid silicone rubber, wherein the masterbatch is obtained by mixing a premix comprising single-walled carbon nanotubes and a base rubber;
   wherein the premix is obtained by pre-mixing the single-walled carbon nanotubes and a polyorganosiloxane;
   wherein the single-walled carbon nanotubes have a diameter of from 1 nm to 50 nm and a length of greater than 5 μm;
   wherein the base rubber comprises 30 to 70 parts of a vinyl silicone oil, 15 to 40 parts of a silica, 5 to 15 parts of a silazane and 1 to 10 parts of a deionized water.

2. The masterbatch of the conductive liquid silicone rubber according to claim 1, wherein the vinyl silicone oil is a vinyl-terminated silicone oil and/or a polyvinyl silicone oil.

3. The masterbatch of the conductive liquid silicone rubber according to claim 2, wherein the silica has a specific surface area of from 280 m$^2$/g to 320 m$^2$/g.

4. The masterbatch of the conductive liquid silicone rubber according to claim 2, wherein the vinyl-terminated silicone oil is an alkyl vinyl silicone oil.

5. The masterbatch of the conductive liquid silicone rubber according to claim 4, wherein the alkyl vinyl silicone oil is a methyl vinyl silicone oil.

6. The masterbatch of the conductive liquid silicone rubber according to claim 2, wherein the silica is a fumed silica that has been grafted in situ with a treating agent and has a specific surface area of not less than 200 m$^2$/g.

7. The masterbatch of the conductive liquid silicone rubber according to claim 6, wherein the treating agent is a silazane.

8. The masterbatch of the conductive liquid silicone rubber according to claim 7, wherein the silazane is at least one or a mixture of two members selected from the group consisting of hexamethylsilazane, tetramethyldivinylsilazane, heptamethyldisilazane, vinyl-mono-terminated silazane, and combinations thereof.

9. The masterbatch of the conductive liquid silicone rubber according to claim 8, wherein the silazane is hexamethylsilazane and/or tetramethyldivinylsilazane.

10. A conductive liquid silicone rubber comprising a conductive filler that comprises single-walled carbon nanotubes; wherein the conductive liquid silicone rubber is prepared from raw materials comprising: a masterbatch of the conductive liquid silicone rubber, a Component I, a Component II, a catalyst, and an inhibitor;
wherein the masterbatch is obtained by mixing a premix comprising single-walled carbon nanotubes and a base rubber; wherein the premix is obtained by pre-mixing the single-walled carbon nanotubes and a polyorganosiloxane; wherein the single-walled carbon nanotubes have a diameter of from 1 nm to 50 nm and a length of greater than 5 μm;
wherein the Component I is one or a mixture of a plurality of compounds represented by Formula (1):

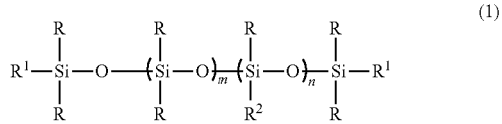
(1)

wherein in Formula (1), n represents an integer from 0 to 100; m represents an integer from 70 to 4000; R represents a saturated hydrocarbyl; $R^1$ represents an unsaturated hydrocarbyl; and $R^2$ represents a saturated or unsaturated hydrocarbyl;
wherein the Component II is one or a mixture of a plurality of compounds represented by Formulas (2) and/or (3):

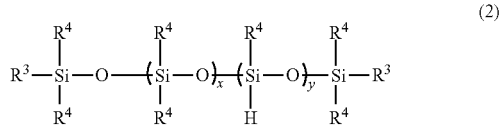
(2)

wherein in Formula (2), x represents an integer from 8 to 200; y represents an integer from 0 to 60; $R^3$ represents methyl, hydrogen or SiH group; and $R^4$ represents methyl, ethyl, propyl or phenyl;

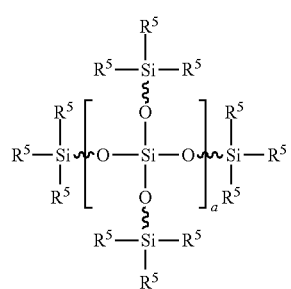
(3)

wherein in Formula (3), a represents an integer of 1 to 300; and $R^5$ represents methyl, ethyl or hydrogen group;
wherein, when the Component II consists essentially of only compound of Formula (2), the two conditions that y=0 and $R^3$ is methyl do not exist at the same time; when the Component II consists essentially of only compound of Formula (3), $R^5$ is hydrogen group; when the Component II is a mixture of the compounds of Formulas (2) and (3), at least one of the compounds of Formulas (2) and (3) has a SiH bond;
wherein the catalyst is a Karstedt catalyst; and
wherein the inhibitor is at least one selected from the group consisting of 1-ethynyl-1-cyclohexanol, 2-methyl-3-butyn-ol, 3,5-dimethyl-1-hexyn-3-ol and 3-methyl-1-dodecyn-3-ol.

11. The conductive liquid silicone rubber according to claim 10, wherein the raw materials for preparing the conductive liquid silicone rubber comprise: the masterbatch in an amount of 100 parts, the Component I in an amount of from 10 parts to 100 parts, the Component II in an amount of 0.4 to 10 parts, the catalyst in an amount of 0.002 to 0.02 parts, and the inhibitor in an amount of 0.02 to 1 parts.

12. The conductive liquid silicone rubber according to claim 11, wherein the Component I is present in an amount of from 10 parts to 65 parts.

13. The conductive liquid silicone rubber according to claim 12, wherein the Component I is present in an amount of from 10 parts to 35 parts.

14. The conductive liquid silicone rubber according to claim 11, wherein the Component II is present in an amount of from 0.4 parts to 5 parts.

15. The conductive liquid silicone rubber according to claim 11, wherein the catalyst is present in an amount of from 0.003 parts to 0.01 parts.

16. The conductive liquid silicone rubber according to claim 11, wherein the inhibitor is present in an amount of from 0.02 parts to 0.5 parts.

17. The conductive liquid silicone rubber according to claim 11, wherein the raw materials for preparing the liquid silicone rubber comprise the Component II in an amount of 0.4 to 5 parts.

18. The conductive liquid silicone rubber according to claim 11, wherein the Component I is a vinyl-terminated silicone oil, a side-chain vinyl silicone oil, or a vinyl-terminated side-chain vinyl silicone oil.

19. The conductive liquid silicone rubber according to claim 11, wherein the Component II is a hydrogen-containing silicone oil comprising SiH at both ends and side chains, or a terminal hydrogen-containing silicone oil.

20. A method of manufacturing a power grid accessory or electric cable accessory, the method comprising making the power grid accessory or electric cable accessory with the conductive liquid silicone rubber of claim 10.

21. The conductive liquid silicone rubber according to claim 10, wherein the single-walled carbon nanotubes are present in an amount of from 0.1% to 10% of a total mass of the liquid silicone rubber.

22. The conductive liquid silicone rubber according to claim 10, wherein the single-walled carbon nanotubes constitute from 5% to 20% by mass of the premix.

23. The conductive liquid silicone rubber according to claim 10, wherein the single-walled carbon nanotubes have a diameter of 1.2 nm to 2 nm and a length of greater than 10 μm.

24. The conductive liquid silicone rubber according to claim 10, wherein the Component I is:

a vinyl-terminated silicone oil in which $R^1$ is vinyl and $R^2$ is a saturated hydrocarbyl;

side chain vinyl silicone oil in which $R^1$ is a saturated hydrocarbyl and $R^2$ is vinyl; or a vinyl-terminated side chain vinyl silicone oil in which both $R^1$ and $R^2$ are vinyl.

25. The conductive liquid silicone rubber according to claim 10, wherein the Component II is:

a hydrogen-containing silicone oil comprising SiH at both ends and side chain in which $R^3$ is hydrogen group and y is greater than 1;

a terminal hydrogen-containing silicone oil in which $R^3$ is hydrogen and y is 0;

a side chain hydrogen-containing silicone oil in which $R^3$ is a saturated hydrocarbyl and y is greater than 1; or a hydrogen-containing silicone resin in which $R^5$ is hydrogen group.

26. The conductive liquid silicone rubber according to claim 10, wherein the premix and base rubber are mixed at a mass ratio of (1 to 10):100.

27. The conductive liquid silicone rubber according to claim 26, wherein the mass ratio is (3.8 to 10):100.

28. A method of preparing a conductive liquid silicone rubber, the method comprising the following steps:

pre-mixing single-walled carbon nanotubes and a polyorganosiloxane to obtain a premix;

mixing the premix and a base rubber to prepare a masterbatch;

mixing the masterbatch, a catalyst, and at least one vinyl silicone oil, and vacuum degassing to obtain Component A;

mixing the masterbatch, at least one vinyl silicone oil, at least one hydrogen-containing silicone oil, and at least one inhibitor, and vacuum degassing to obtain Component B;

mixing said Component A and said Component B in equal proportions, and subjecting the mixture to curing; and vulcanizing to obtain the conductive liquid silicone rubber.

29. The method according to claim 28, further comprising the steps:

thoroughly mixing a methyl vinyl silicone oil, silica, a silazane, and deionized water at 60° C. to 90° C. under an inert atmosphere, increasing a temperature to 130° C. to 180° C. and vacuuming for 2 to 4 hours while keeping the temperature at 130° C. to 180° C. during vacuuming, cooling to a temperature of 120° C. to 140° C. after vacuuming, adding a methyl vinyl silicone oil for dilution, and stirring until homogeneous to obtain the base rubber.

30. The method according to claim 28, wherein the single-walled carbon nanotubes constitute from 5% to 20% by mass of the premix.

31. The method according to claim 28, wherein a mass ratio of the premix to the base rubber in the masterbatch is from (1 to 100):100.

32. The method according to claim 31, wherein the mass ratio is (3.8 to 10):100.

33. The method according to claim 28, wherein the curing is carried out at a temperature of 130° C. to 170° C.; and/or the vulcanization is carried out at a temperature of 180° C. to 220° C.

34. A method of manufacturing a power grid accessory or electric cable accessory, the method comprising manufacturing the accessory using the conductive liquid silicone rubber prepared by the method of claim 28.

35. The method according to claim 28, wherein the premix and the base rubber are mixed on a three-roll mill.

36. A masterbatch of a conductive liquid silicone rubber, wherein the masterbatch is prepared by a process comprising a step of mixing a premix and a base rubber on a three-roll mill to obtain the masterbatch; wherein the mixing is conducted until a resulting mixture has a particle size of from 0.1 μm to 20 μm;

wherein the premix is obtained by pre-mixing single-walled carbon nanotubes and a polyorganosiloxane;

wherein the single-walled carbon nanotubes have a diameter of from 1 nm to 50 nm and a length of greater than 5 μm.

* * * * *